000
United States Patent

Johansson et al.

(10) Patent No.: US 8,320,367 B1
(45) Date of Patent: Nov. 27, 2012

(54) TRANSITIONING TELEPHONE FROM GUEST MODE TO CUSTOM MODE BASED ON LOGGING IN TO COMPUTING SYSTEM

(75) Inventors: Olof Johansson, Belmont, CA (US); Scott Redman, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,707

(22) Filed: Sep. 29, 2011

(51) Int. Cl.
 *H04L 12/66* (2006.01)
(52) U.S. Cl. ......................... 370/352; 370/356
(58) Field of Classification Search .......................... None
 See application file for complete search history.

(56) References Cited

U.S. PATENT DOCUMENTS

| | | | | |
|---|---|---|---|---|
| 6,400,939 B1 * | 6/2002 | Virtanen et al. | ............. | 455/410 |
| 2002/0112150 A1 * | 8/2002 | Lawing et al. | ..................... | 713/1 |
| 2005/0069097 A1 * | 3/2005 | Hanson et al. | ............. | 379/88.12 |
| 2008/0148154 A1 * | 6/2008 | Burrell et al. | .................. | 715/733 |
| 2010/0303061 A1 * | 12/2010 | Wan et al. | ..................... | 370/352 |

* cited by examiner

*Primary Examiner* — Chandrahas Patel
*Assistant Examiner* — Justin N Mullen
(74) *Attorney, Agent, or Firm* — Brake Hughes Bellermann LLP (57) ABSTRACT

Various example embodiments are disclosed. According to an example embodiment, a non-transitory, computer-readable medium may include computer-executable instructions stored thereon. When executed by at least one processor, the instructions may be configured to cause a computing system to at least initialize a Voice over Internet Protocol (VoIP) telephone program in a guest mode configured to allow any user of the computing system to place telephone calls, and in response to a user logging in to the computing system, transition the VoIP telephone program from the guest mode to a custom mode for the logged-in user.

14 Claims, 5 Drawing Sheets

TRANSITIONING TELEPHONE FROM GUEST MODE TO CUSTOM MODE BASED ON LOGGING IN TO COMPUTING SYSTEM

TECHNICAL FIELD

This description relates to telephone services implemented on computer systems.

BACKGROUND

Computer systems may have various identification or authentication schemes which allow users to access their customized desktops on the computer systems. Users may power computers on and use the computers in a "guest" mode, in which some features or information may be unavailable to the user. The user may log in to the computer using, for example, a username and password, and the computer may make features or information specific to the user's account available.

SUMMARY

According to one general aspect, a non-transitory, computer-readable medium may include computer-executable instructions stored thereon. When executed by at least one processor, the instructions may be configured to cause a computing system to at least initialize a Voice over Internet Protocol (VoIP) telephone program in a guest mode configured to allow any user of the computing system to place telephone calls, and in response to a user logging in to the computing system, transition the VoIP telephone program from the guest mode to a custom mode for the logged-in user.

According to another general aspect, a non-transitory, computer-readable medium may include computer-executable instructions stored thereon. When executed by at least one processor, the instructions may be configured to cause a computing system to at least, in response to a user logging in to the computing system, send a first message to a Voice over Internet Protocol (VoIP) telephone prompting the VoIP telephone to transition from a guest mode to a custom mode for the logged-in user, and, in response to the user logging out of the computing system, send a second message to the VoIP telephone prompting the VoIP telephone to transition from the custom mode back to the guest mode.

According to another general aspect, a computing system may include at least one processor and at least one memory. The at least one memory may include instructions stored thereon that, when executed by the at least one processor, are configured to cause the computing system to at least initialize a Voice Over Internet Protocol (VoIP) telephone program in a guest mode configured to allow any user of the computing system to place telephone calls, and in response to a user logging in to the computing system, transition the VoIP telephone program from the guest mode to a custom mode for the logged-in user.

The details of one or more implementations are set forth in the accompanying drawings and the description below. Other features will be apparent from the description and drawings, and from the claims.

DETAILED DESCRIPTION

Computing devices or systems, such as desktop or tower computers, laptop or notebook computers, or tablet computers, may store personal information on behalf of users. Users may protect their personal information by utilizing login procedures, such as setting the computing system to require a user name and/or password, to access the personal information. The computing system may, for example, allow guest users access to programs (such as web browsers) without logging in, but deny the guest users access to files and/or settings of the computing system, such as files and/or settings associated with an account of the user, until logging in.

After a user has logged in, the computing system may, for example, present a personalized desktop to the logged-in user, allow the user to access files which have been saved while the user was previously logged in, and/or restore settings to programs which the user has previously set during previous logins. The user may thereby store settings and/or files on the computing system which will be accessible to the user, but not accessible to other users and/or guests of the same computing system. In an example in which the user logs into a remote server, the user may log in from any device or location, and the computing system will appear to be the same to the user as during a previous login once the user logs in. The features of allowing or preventing access to files and/or settings based on whether a user has logged in may be features of an operating system (OS) of the computing system, according to an example embodiment.

Figure 1:
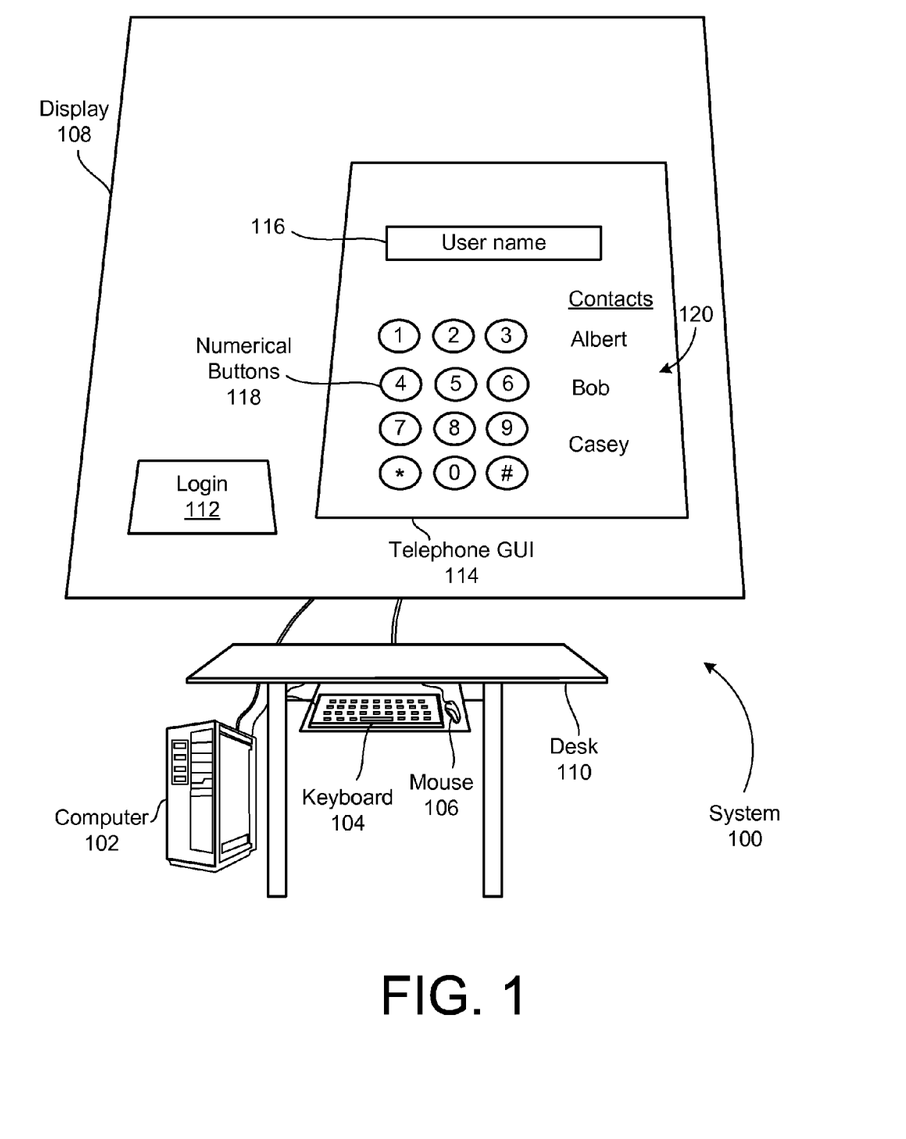
FIG. 1 is a diagram showing a computer system according to an example embodiment.

FIG. 1 is a diagram showing a computing system 100 according to an example embodiment. The computing system 100 may log in or authenticate a user into a Voice over Internet Protocol (VoIP) telephone program in response to the user logging in to the computing system 100. While the term, "VoIP telephone program" is used herein, the present disclosure may also apply to other telephone programs implemented on a computing system. The computing system 100 may, for example, initialize the VoIP telephone program in a guest mode, without authenticating any user, when the computing system 100 powers on.

In the guest mode, the VoIP telephone program may allow the user to place calls. The computing system 100 may also run other programs, such as a browser, word processor, calendar program, and/or email program, as non-limiting examples. When placing calls from the guest mode, the VoIP telephone program may not include a telephone number as the source of the call, causing a caller identification (ID) system at a recipient's end to display, "blocked," "anonymous," or "private" as the source telephone number, or the VoIP telephone program may include a telephone number of an administrator, organization, or business from which the call is placed, rather than the telephone number of a specific employee, according to example embodiments. In an example embodiment, the VoIP telephone program may not be associated with a telephone number when in the guest mode, and may not receive calls in the guest mode due to the lack of association of a telephone number with the VoIP telephone program. The receive telephone call functionality may, for example, be disabled in the guest mode. In the guest mode, the VoIP telephone program may disable the receive call functionality so that the VoIP telephone program may not receive calls. In another example embodiment, the VoIP telephone program may be associated with a guest telephone number and may receive telephone calls placed to the guest telephone number, similar to a pay telephone receiving telephone calls.

When the user logs in to the computing system 100, the computing system 100 may transition the VoIP telephone program from the guest mode to a custom mode. The custom mode may be associated with an account of the logged-in user. The VoIP program may have multiple custom modes, each associated with a different logged-in user's account.

In the custom mode, the VoIP telephone program may be associated with a telephone number associated with the logged-in user, and/or an account of the logged-in user. The account of the logged-in user may, for example, be maintained on the computing system 100, or on a remote server which includes the user's account, the user's contact lists, received voicemail messages, and/or configuration options set by the user (or by default). The VoIP telephone program may, for example, receive calls at the telephone number associated with the logged-in user, and/or include the telephone number associated with the logged-in user in placed calls, so that the telephone number associated with the logged-in user (and/or name of the logged-in user) is displayed by a caller ID feature of a telephone system of the recipient of the placed call. If the VoIP telephone program receives calls at a guest telephone number when in the guest mode, the VoIP telephone program may or may not receive calls at the guest telephone number when in the custom mode, according to example embodiments.

When in the custom mode, the VoIP telephone program may store and/or access a list of contacts for the logged-in user. The telephone program may also store other settings, such as ringtones and/or backgrounds associated with the logged-in user. The VoIP telephone program may, for example, store names and associated telephone numbers for the logged-in user, and/or may access a contacts database associated with the logged-in user, such as a database stored in association with Microsoft Outlook, an iPod, iPhone, or iPad touch, MobileMe, or iCloud address book, Facebook Contacts, Google Contacts, or other electronic database associating persons with telephone numbers. The VoIP telephone program and/or computing system 100 may also download the contacts from a remote server. The VoIP telephone program may also store and access speed-dial telephone numbers when in the custom mode, according to an example embodiment.

The VoIP telephone program may place calls to persons in the contacts database on behalf of the logged-in user. The VoIP telephone program may, for example, present the contact list to the user. The VoIP telephone program may present the contact list to the user by presenting the names of the contacts to the user, and may optionally also present the telephone numbers and/or other contact information associated with the contacts to the user. The user may select one (or more in the case of a multiparty call) of the presented contacts, and the VoIP telephone program may place the call to the selected contact(s).

The transitioning of the VoIP telephone program from the guest mode to the custom mode, described above, may be implemented by an operating system (OS) of the computing system 100, or may be implemented by an interaction between the OS, the VoIP telephone program, and an identification program, according to an example embodiment. For example, upon the computing system 100 powering on, the OS may initialize the VoIP telephone program, and the VoIP telephone program may activate or launch in the guest mode. The OS may initialize the VoIP telephone program based on the VoIP telephone program being included in a list of programs for the OS to initialize upon powering on. The VoIP telephone program may activate or launch in the guest mode based on the initialization by the OS, in the absence of any further instructions.

When the user logs in, the OS may initialize an identification program. The identification program may be a standalone program, or may be part of another program or software and not separately executable, according to example embodiments. The OS may initialize the identification program based on the identification program being included in a list of programs for the OS to initialize upon the user logging in. The identification program may activate or launch, send a message to the VoIP telephone program, and then either terminate or continue running until logout. The message from the identification program may prompt the VoIP telephone program to transition from the guest mode to the custom mode associated with the logged-in user. The message, which may be considered an event message, may include, for example, an identification and/or authentication of the logged-in user. The authentication may include, for example, a username and/or password associated with the user. The authentication of the logged-in user by the message sent by the identification program may save the user the time or effort of logging into the VoIP telephone program after already logging into the computing system 100. Thus, by logging into the computing system 100, the user may simultaneously (or also) log into the VoIP telephone program without further input from the user.

If the identification program continues running until the user logs out, then when the user logs out, the identification program may send a logout message to the VoIP telephone program indicating that the user is logging out. The VoIP telephone program may respond to the message indicating that the user is logging out by transitioning from the custom mode back to the guest mode. The identification program may terminate after sending the logout message to the VoIP telephone program.

The example computing system 100 shown in FIG. 1 may include a computer 102. While a tower computer 102 is shown in FIG. 1, the computing system 100 may include a desktop computer, laptop or notebook computer, tablet computer, or interface to a mainframe or server, according to example embodiments. The computer 102 may include one or more processors, at least one memory device, and connections to input and output devices.

The computer 102 may receive and provide audio input and output from and to the user, such as the audio input and output processed by and provided by the VoIP telephone program, via a microphone and speaker (not shown in FIG. 1). The microphone and speaker may be connected to the computer 102 via wires, cables, or cords in the example of fixed microphone and speaker, or via a wireless interface in the example of a wireless headset, such as a Bluetooth headset, according to example embodiments.

In an example embodiment, the microphone and speaker may be included in a separate or standalone VoIP telephone. The separate VoIP telephone may be coupled to the computer 102, such as via an Ethernet cable or other wired (e.g., USB) or wireless interface. The separate VoIP telephone may include a speaker and microphone, which may have a form factor of a traditional telephone handset. The separate VoIP telephone may also include a keypad with numbers for dialing telephone numbers, buttons or levers for detecting when the handset has been picked up to place or accept a call and when the handset has been placed down to end a call, and may include other buttons, such as buttons to navigate menus or a contact list. The separate VoIP telephone may also include a display, which may be a touchscreen, according to an example embodiment.

The computing system 100 may include input devices such as a keyboard 104 and/or mouse 106 or trackball. The keyboard 104 and/or mouse 106 may be coupled to the computer 102 and provide input to the computer 102. The keyboard 104 may receive keystrokes from the user and transmit the keystrokes to the computer 102. For example, the keyboard 104 may receive a username and password from the user and transmit the received username and password to the computer 102. The mouse 106 may allow the user to control a cursor on a display 108 coupled to the computer 102. The mouse 106 may, for example, allow the user to place the cursor in username and password fields shown on the display 108 so that the user can enter his or her username and password into the username and password fields.

The computing system 100 may also include the display 108. The display 108 shown in FIG. 1 is not drawn to scale, but is expanded relative to the other components in the system 100 for illustrative purposes. The display 108 may include, for example, a liquid crystal display (LCD), plasma screen, light-emitting diode (LED) screen, cathode ray tube (CRT), or touchscreen. The display 108 may rest on a desk 110. The desk 110 may support the display 108, the keyboard 104, and the mouse 106. In some embodiments, the desk 110 may also support the computer 102.

The display 108 may provide output to the user based on instructions received from the computer 102. In an example embodiment, the display 108 may also receive input from the user, by acting as a touchscreen display. The computer 102 may provide the output instructions to the display 108 based, for example, on features of the OS and/or the VoIP telephone program. The display 108 may, for example, present a login interface 112 to the user. The login interface 112 may include fields such as the username field and password field described above. The login interface 112 may receive the username and password from the user via the username and password fields, and pass the user's username and password to the OS, thereby allowing the OS to identify and/or authenticate the user and thereafter log the user in to the OS of the computing system 100.

Based on instructions from the VoIP telephone program and/or OS, the display 112 may present or display a telephone graphical user interface (GUI) 114 to the user. The telephone GUI 114 may serve as an on-screen keyboard, allowing the user to dial telephone numbers, select contacts to call, and receive calls.

While FIG. 1 shows the computing system 100 with a single display 108 that includes the telephone GUI 114, the computing system 100 may also include a separate screen or display for the telephone interface and/or telephone GUI 114. In the example of a separate screen or display, the separate screen or display may appear to represent a standalone telephone, with the software for executing the telephone executing on the computer 102.

In an example embodiment, the telephone GUI 114 may display a User Name 116. The User Name 116 may include text in the telephone GUI 114 which may identify the logged-in user when in the custom mode, such as by indicating the logged-in user's name. When in the guest mode, the User Name 116 may indicate that no user is logged in, such as by indicating "Guest", or another predetermined textual display, according to an example embodiment.

The telephone GUI 114 may also include numerical buttons 118. The numerical buttons 118 may, for example, include buttons corresponding to the digits 0-9, as well as an asterisk ("*") button and/or pound sign ("#") button, similar to a standard touchtone telephone. The numerical buttons 118 may allow the user to provide numerical inputs into the telephone GUI 114. The user may also provide numerical inputs into the telephone GUI 114 via the keyboard 104 when the telephone GUI 114 is active on the display 108, according to an example embodiment. The telephone GUI 114 may also include other buttons not shown in FIG. 1, such as buttons to accept or receive a call, buttons to end or hang up on a call, volume buttons, and menu buttons, as non-limiting examples.

The telephone GUI 114 may also include a contacts display 120. The contacts display 120 may display the contacts associated with the user (and/or user's account), and may allow the user to select a contact(s) so as to place a telephone call to the contact(s). While FIG. 1 shows only three names of contacts, other numbers of contacts may be included in the telephone GUI 114. The user may, for example, click on a contact, using the cursor controlled by the mouse 106, to place a call to the contact. The user may change the contacts displayed in the contacts display 120 by interacting with the contacts display 120 and/or the telephone GUI 114 via the cursor controlled by the mouse 106, and/or via the keyboard 104. The user may, for example, scroll up or down through the contacts, and/or may enter letters of the desired contact's name to change the contacts displayed in the contacts display 120. The telephone GUI 114 may display the contacts as text, pictures, icons, photographs, or combinations thereof.

In an example embodiment, the telephone GUI 114 and/or VoIP telephone program may receive and process voice commands from the user. The telephone GUI 114 and/or VoIP telephone program may, for example, receive and process voice commands to dial dictated telephone numbers or contact names, and/or to accept a call, according to example embodiments.

Figure 2:
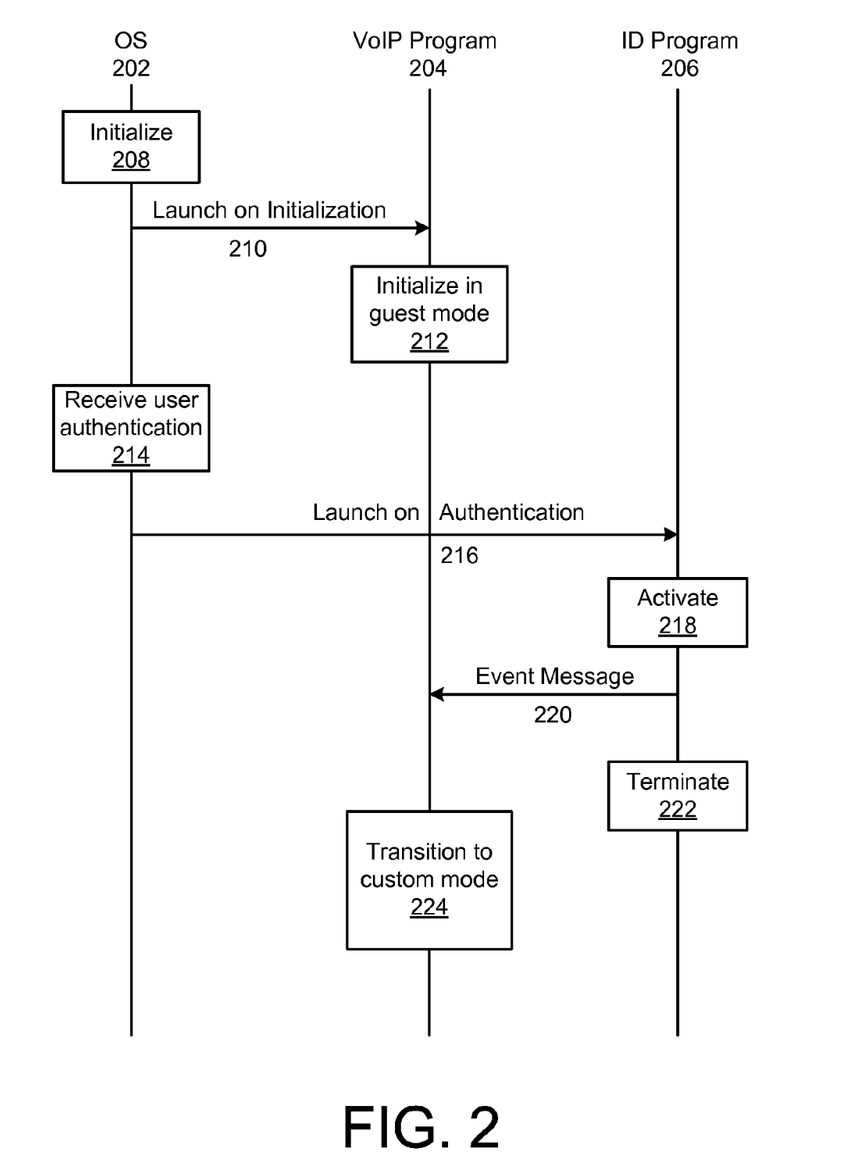
FIG. 2 is a vertical time-sequence diagram showing actions performed by, and messages exchanged between, an operating system, a Voice over Internet Protocol (VoIP) telephone program, and an identification program of the system shown in FIG. 1.

FIG. 2 is a vertical time-sequence diagram showing actions performed by, and messages exchanged between, the OS 202, the VoIP program 204, and the identification program 206 of the system 100 shown in FIG. 1. The telephone program 204 may run on a same processor (or set of multiple processors) as other applications run by the computing system 100, or may run on a separate processor(s) as an integrated part of the system, such as a telephone program built into the system 100, or separately, such as a telephone device coupled to the system 100 (via an Ethernet, USB, 802.11 WLAN, 802.15 Bluetooth, or other interface). Upon the computing system 100 powering on, the OS 202 may initialize (208). After or as part of the initialization (208), the OS 202 may launch the VoIP telephone program 204 (210). The OS 202 may launch the VoIP telephone program 204 without indicating any particular user, because at this point, no user has logged in to the computing system 100. The OS 202 may launch the VoIP telephone program 204 based on the VoIP telephone program 204 being included in a list of programs to launch on initialization, according to an example embodiment. The OS 202 may also launch other programs, such as a browser, word processor, calendar program, chat or instant messenger program, and/or email program, as non-limiting examples.

Based on the launching by the OS 202, the VoIP telephone program 204 may initialize in guest mode (212). In guest mode, the VoIP telephone program 204 may not be identified with any user, but may allow the user to place telephone calls, as described above.

At some time after initialization (208), the OS 202 may receive a user's authentication (214) and/or login. The OS 202 may, for example, receive the user's authentication by receiving the user's username and password via the login interface 112 described above.

After receiving the user's authentication (214), the OS 202 may launch the ID program 206 (216). The OS may launch the ID program 206, and may provide the user's identification and/or authorization information to the ID program 206.

The ID program 206 may activate (218) after being launched by the OS 202. After or upon activation, the ID program 206 may send an event message 220 to the VoIP telephone program 204. The event message 220 may prompt the VoIP telephone program 204 to transition from the guest mode to the custom mode. The event message 220 may also include identification and/or authentication information for the logged-in user. After sending the event message 220 to the VoIP telephone program 204, the ID program 206 may terminate (222).

After receiving the event message 220, the VoIP telephone program 204 may transition from the guest mode to the custom mode (224). The VoIP telephone program 204 may transition to the custom mode associated with the user identified by the event message 220. In the custom mode, the VoIP telephone program 204 may include the features and perform the functions described above. When the user logs out, the VoIP telephone program 204 may transition back to the guest mode.

In an example in which the VoIP telephone program 204 was facilitating an ongoing call in guest mode when the user logged in, the VoIP telephone program 204 may remain in the guest mode until the call is finished, rather than transitioning to the custom mode, and transition to the custom mode only after the call is finished. Similarly, in an example in which the VoIP telephone program 204 was facilitating an ongoing call in custom mode when the user logged out, the VoIP telephone program 204 may remain in the custom mode until the call is finished, and transition back to the guest mode only after the call is finished. In an example embodiment, a security setting may terminate an ongoing call in the custom mode when the user logs out during the call, thereby preventing a call from continuing in the custom mode after the user has logged out.

Returning to FIG. 1, the computing system 100 may also transition a standalone VoIP telephone between the guest mode and the custom mode based on the user logging in and out. For example, the computer 102 may be coupled to the standalone VoIP telephone via an Ethernet switch or a wireless interface. The computer 102 may send a message to the standalone VoIP telephone prompting the standalone VoIP telephone to transition between the guest mode and the custom mode based on the user logging in and out, and the standalone VoIP telephone may respond to the messages by transitioning between the guest mode and the custom mode according to the prompts, according to an example embodiment. The message may include authentication information, such as a username and password of the user.

In an example setting, an office may include the computing system 100 and desk 110. The computing system 100 and desk 110 may be shared between multiple employees. The employees who share the computing system 100 and desk 110 may work different shifts, such as three different eight-hour shifts, or work on different days. Upon powering the computing system 100 on, the display 108 may show a generic desktop, which may include the telephone GUI 114 in a guest mode. When an employee logs into the computing system 100, the employee's particular configuration may be displayed on the display 108, and the VoIP telephone program may enter the custom mode with the account associated with the employee who logged in. The employee may then have access to any voice messages which were left with his or her telephone number, may see any missed calls, may send calls to his or her contacts, and may receive calls at his or her telephone number, according to an example embodiment. The computing system 100 could also be used in a conference room, in which users could log into the computing system 100 and make calls to their contacts from the conference room, according to an example embodiment.

Figure 3:
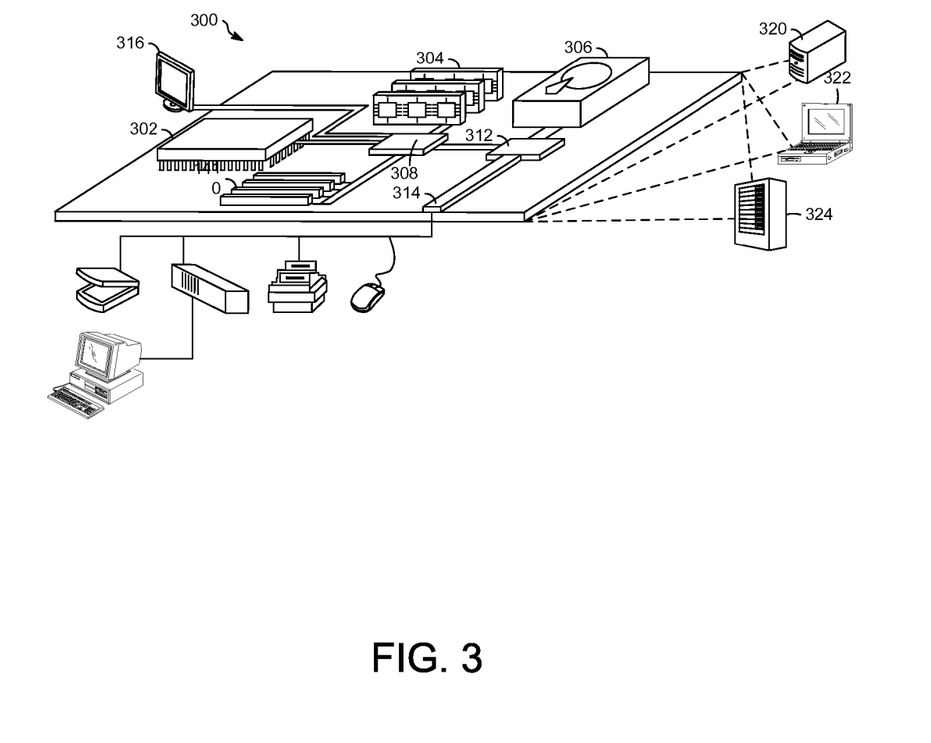
FIG. 3 shows an example of a computing device that can be used to implement the techniques described here.

FIG. 3 shows an example of a computing device 300 that can be used to implement the techniques described here. Computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown. Each of such devices may contain one or more of computing device 300, and an entire system may be made up of multiple computing devices 300 communicating with each other.

Figure 4:
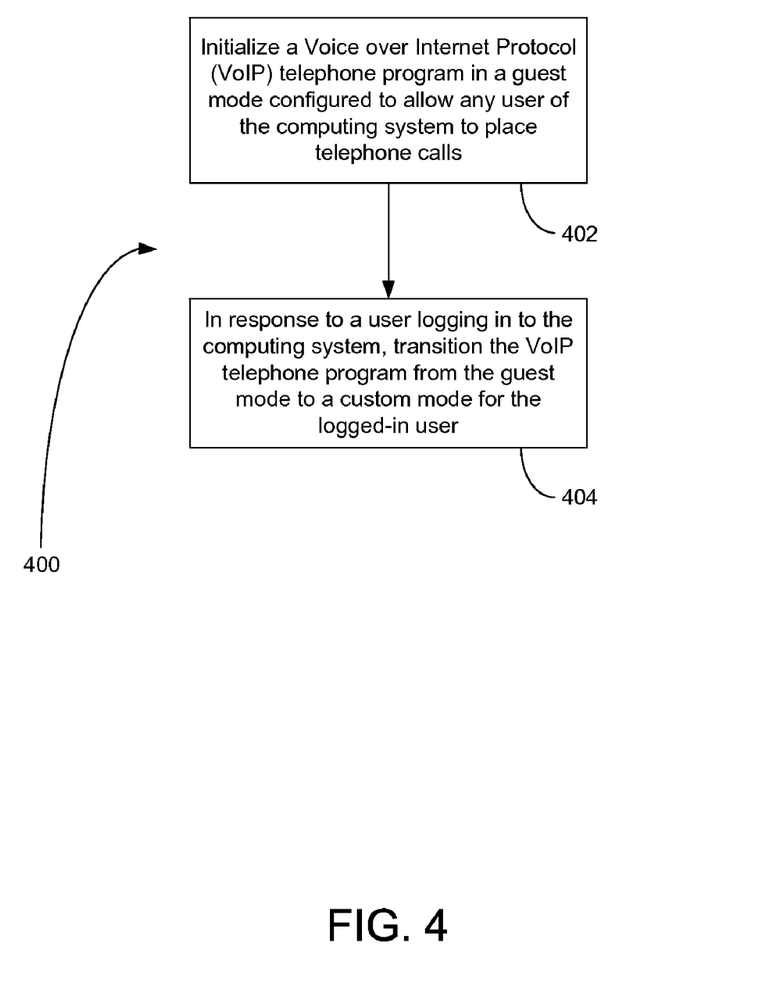
FIG. 4 is a flowchart showing a method according to an example embodiment.

FIG. 4 is a flowchart showing a method 400 according to an example embodiment. According to an example embodiment, the method 400 may include initializing a Voice Over Internet Protocol (VoIP) telephone program 204 in a guest mode configured to allow any user of the computing system 100 to place telephone calls (402). The method 400 may also include, in response to a user logging in to the computing system 100, transitioning the VoIP telephone program 204 from the guest mode to a custom mode for the logged-in user (404).

According to an example embodiment, the initializing the VoIP telephone program 204 may be performed in response to the computing system 100 powering on.

According to an example embodiment, the VoIP telephone program 204 may be configured to include a telephone number associated with the logged-in user when placing a call in the custom mode.

According to an example embodiment, the VoIP telephone program 204 may be configured to receive calls at a telephone number associated with the logged-in user when in the custom mode.

According to an example embodiment, the method 400 may include the VoIP telephone program 204 performing the following, when in the custom mode: presenting, to the logged-in user, a contact list associated with the logged-in user or the logged-in user's account; receiving, from the logged-in user, a selection of a contact from the contact list; and placing a call to the selected contact in response to receiving the selection.

According to an example embodiment, the method 400 may include an identification program 206 performing the following: activating in response to the user logging in to the computing system 100, sending a message 220 to the VoIP telephone program 204 identifying the logged-in user and prompting the VoIP telephone program 204 to transition from the guest mode to the custom mode, and terminating after sending the message.

According to an example embodiment, the method 400 may include an identification program 206 performing the following: activating in response to the user logging in to the computing system 100, sending a message 220 to the VoIP telephone program 204 authenticating the logged-in user and prompting the VoIP telephone program 204 to transition from the guest mode to the custom mode, and terminating after sending the message.

According to an example embodiment, the VoIP telephone program 204 may include a graphical user interface (GUI) 114 comprising numerical buttons configured to receive numbers for placing a telephone call.

According to an example embodiment, the method 400 may include an operating system 202 initializing the VoIP telephone program 204 in the guest mode in response to the computing system 100 powering on, the VoIP telephone program 204 allowing any user of the computing system 100 to place telephone calls but not receive telephone calls in the guest mode, the operating system 202 initializing an identification program 206 in response to the user logging in to the computing system 100, the identification program 206 sending a message to the VoIP telephone program 204 prompting the VoIP telephone program 204 to transition from the guest mode to the custom mode, and the VoIP telephone program 204 placing and receiving telephone calls from and to a telephone number associated with the logged-in user in the custom mode.

Figure 5:
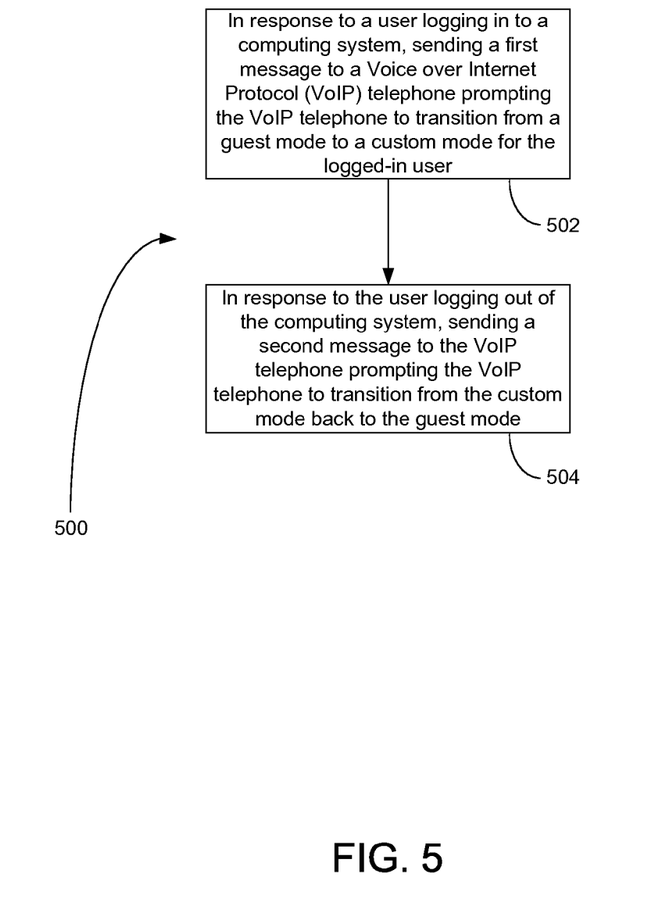
FIG. 5 is a flowchart showing a method according to another example embodiment.

FIG. 5 is a flowchart showing a method 500 according to another example embodiment. According to an example embodiment, the method 500 may include, in response to a user logging in to a computing system 100, sending a first message to a Voice over Internet Protocol (VoIP) telephone prompting the VoIP telephone to transition from a guest mode to a custom mode for the logged-in user (502). The method 500 may also include, in response to the user logging out of the computing system, sending a second message to the VoIP telephone prompting the VoIP telephone to transition from the custom mode back to the guest mode (504).

According to an example embodiment, the message prompting the VoIP telephone to transition from the guest mode to the custom mode may identify the logged-in user.

According to an example embodiment, the message prompting the VoIP telephone to transition from the guest mode to the custom mode may identify and authenticate the logged-in user.

According to an example embodiment, the method 500 may further include the computing system 100 sending contacts and/or other settings associated with the logged-in user to the VoIP telephone. The other settings may include, for example, ringtones or backgrounds.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having one or more display devices (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory, computer-readable medium comprising computer-executable instructions stored thereon that, when executed by at least one processor, are configured to cause a computing system to at least:
   in response to the computing system powering on, initialize a Voice over Internet Protocol (VoIP) telephone program in a guest mode configured to allow any user of the computing system to place telephone calls in association with a guest telephone number; and
   in response to a user logging in to an operating system of the computing system, transition the VoIP telephone program from the guest mode to a custom mode for the logged-in user, the transitioning from the guest mode to the custom mode including loading a contact list associated with the logged-in user,
   wherein the instructions include:
   the operating system configured to:
      initialize the VoIP telephone program in the guest mode in response to the computing system powering on; and
      initialize an identification program in response to the user logging in to the operating system;
   the VoIP telephone program configured to:
      allow any user of the computing system to place telephone calls with received telephone calls disabled in the guest mode; and
      place and receive telephone calls from and to a telephone number associated with the logged-in user in the custom mode; and
   the identification program configured to:
      send a first message to the VoIP telephone program prompting the VoIP telephone program to transition from the guest mode to the custom mode in response to the user logging in to the operating system; and
      send a second message to the VoIP telephone program prompting the VoIP telephone program to transition from the custom mode to the guest mode in response to the user logging out of the operating system.

2. The computer-readable medium of claim 1, wherein the VoIP telephone program is configured to include the telephone number associated with the logged-in user when placing a call in the custom mode.

3. The computer-readable medium of claim 1, wherein the VoIP telephone program is configured to receive calls at the telephone number associated with the logged-in user when in the custom mode.

4. The computer-readable medium of claim 1, wherein the VoIP telephone program is configured to, when in the custom mode:
   present, to the logged-in user, the contact list associated with the logged-in user;
   receive, from the logged-in user, a selection of a contact from the contact list; and
   place a call to the selected contact in response to receiving the selection.

5. The computer-readable medium of claim 1, wherein the identification program is configured to:
   activate in response to the user logging in to the operating system of the computing system; and
   send the first message to the VoIP telephone program identifying the logged-in user and prompting the VoIP telephone program to transition from the guest mode to the custom mode.

6. The computer-readable medium of claim 1, wherein the identification program is configured to:
   activate in response to the user logging in to the operating system of the computing system; and
   send the first message to the VoIP telephone program authenticating the logged-in user and prompting the VoIP telephone program to transition from the guest mode to the custom mode.

7. The computer-readable medium of claim 1, wherein the computing system includes a local computing system directly receiving input from the user.

8. A computing system comprising:
   at least one processor; and
   at least one memory comprising instructions stored thereon that, when executed by the at least one processor, are configured to cause the computing system to at least:
      in response to the computing system powering on, initialize a Voice Over Internet Protocol (VoIP) telephone program in a guest mode configured to allow any user of the computing system to place telephone calls in association with a guest telephone number; and
      in response to a user logging in to an operating system of the computing system, transition the VoIP telephone program from the guest mode to a custom mode for the logged-in user, the transitioning from the guest mode to the custom mode including loading a contact list associated with the logged-in user,
wherein the instructions include:
the operating system configured to:
  initialize the VoIP telephone program in the guest mode in response to the computing system powering on; and
  initialize an identification program in response to the user logging in to the operating system;
the VoIP telephone program configured to:
  allow any user of the computing system to place telephone calls with received telephone calls disabled in the guest mode; and
  place and receive telephone calls from and to a telephone number associated with the logged-in user in the custom mode; and
the identification program configured to:
  send a first message to the VoIP telephone program prompting the VoIP telephone program to transition from the guest mode to the custom mode in response to the user logging in to the operating system; and
  send a second message to the VoIP telephone program prompting the VoIP telephone program to transition from the custom mode to the guest mode in response to the user logging out of the operating system.

9. The computing system of claim 8, wherein the VoIP telephone program is configured to include the telephone number associated with the logged-in user when placing a call in the custom mode.

10. The computing system of claim 8, wherein the VoIP telephone program is configured to receive calls at the telephone number associated with the logged-in user when in the custom mode.

11. The computing system of claim 8, wherein the VoIP telephone program is configured to, when in the custom mode:
  present, to the logged-in user, the contact list associated with the logged-in user;
  receive, from the logged-in user, a selection of a contact from the contact list; and
  place a call to the selected contact in response to receiving the selection.

12. The computing system of claim 8, wherein the identification program is configured to:
  activate in response to the user logging in to the operating system of the computing system; and
  send the first message to the VoIP telephone program identifying the logged-in user and prompting the VoIP telephone program to transition from the guest mode to the custom mode.

13. The computing system of claim 8, wherein the identification program is configured to:
  activate in response to the user logging in to the operating system of the computing system; and
  send the first message to the VoIP telephone program authenticating the logged-in user and prompting the VoIP telephone program to transition from the guest mode to the custom mode.

14. The computing system of claim 8, wherein the transitioning to the custom mode includes retrieving the contact list associated with the user and information associated with contacts in the contacts list.

* * * * *